Figure 1:
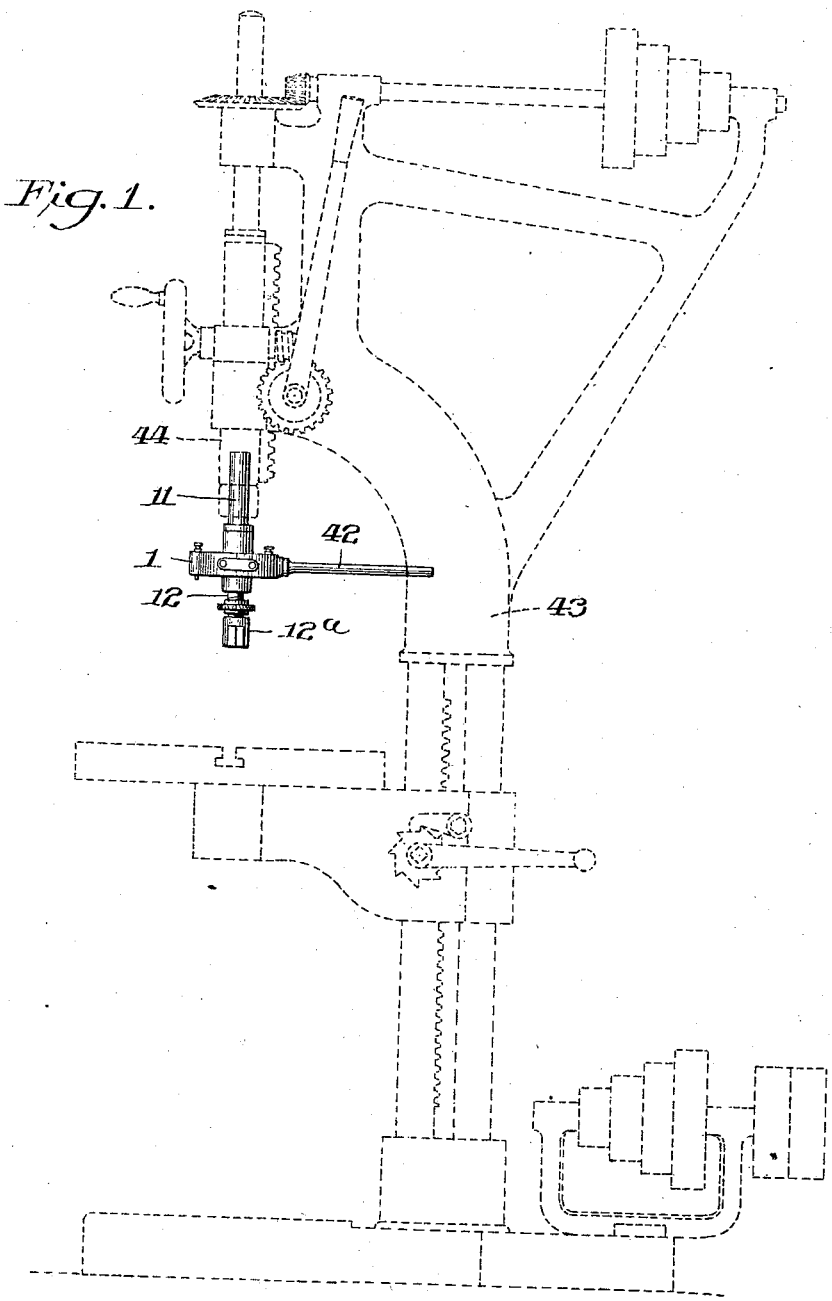

No. 721,930. PATENTED MAR. 3, 1903.
W. H. ZELLERS.
TOOL ACTUATING ATTACHMENT FOR DRILLING MACHINES.
APPLICATION FILED JUNE 24, 1902.
NO MODEL.
2 SHEETS—SHEET 1.

WITNESSES:
INVENTOR:
William H. Zellers
BY
A. V. Grout
ATTORNEY.

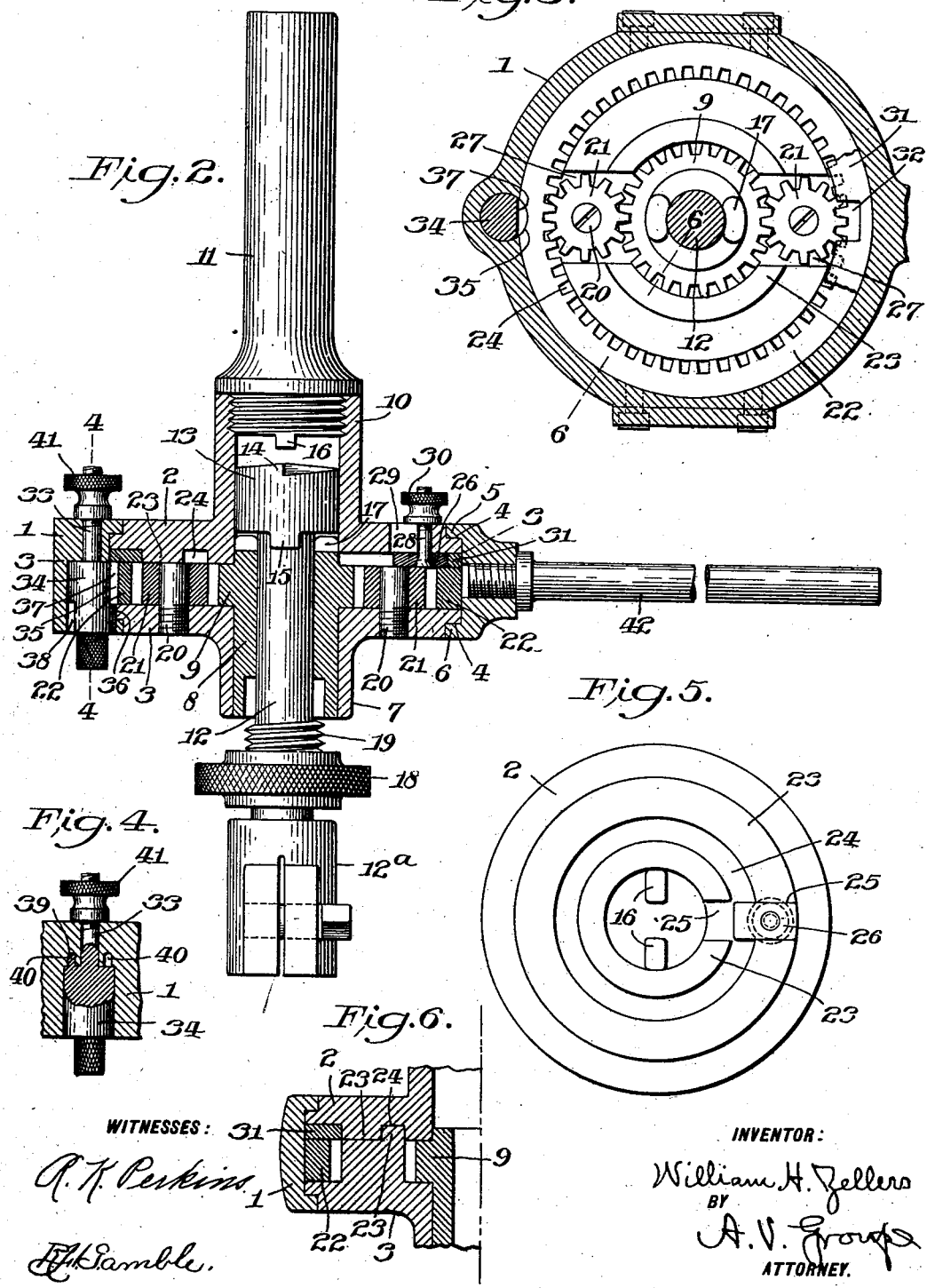

UNITED STATES PATENT OFFICE.

WILLIAM H. ZELLERS, OF PHILADELPHIA, PENNSYLVANIA.

TOOL-ACTUATING ATTACHMENT FOR DRILLING-MACHINES.

SPECIFICATION forming part of Letters Patent No. 721,930, dated March 3, 1903.

Application filed June 24, 1902. Serial No. 112,980. (No model.)

*To all whom it may concern:*

Be it known that I, WILLIAM H. ZELLERS, a citizen of the United States, residing at Philadelphia, in the county of Philadelphia and State of Pennsylvania, have invented certain new and useful Improvements in Tool-Actuating Attachments for Drilling-Machines, of which the following is a specification.

This invention relates to attachments for drilling-machines, and has for its object to provide a simple and efficient attachment whereby the direction of rotation of the tool-holder may be readily reversed when desired and whereby different speeds may be given the tool-holder.

With this object in view my invention comprises various novel features of construction and combinations of parts, which will be hereinafter fully described and claimed.

In the drawings, Figure 1 is a side elevation of my improved attachment as applied to a well-known type of drilling-machine, the latter being shown in dotted lines. Fig. 2 is a vertical section through the attachment. Fig. 3 is a horizontal section thereof as on the line 3 3 of Fig. 2. Fig. 4 is a sectional detail as on the line 4 4 of Fig. 2. Fig. 5 is a view of the under face of the upper disk. Fig. 6 is a sectional detail as on the line 6 6 of Fig. 3.

1 designates a circular frame in which are rotatably mounted a pair of disks 2 3, the latter being provided with offsets 4, which register with internal flanges 5 6 at the top and bottom of said frame, respectively. The lower disk 3 is provided with a downwardly-extending boss 7, to which is loosely fitted the hub 8 of a gear-wheel 9. The upper disk 2 is provided with an upwardly-extending boss 10, which has affixed thereto the lower end of a shank 11, forming, in effect, a continuation of said boss.

Slidingly fitted to the hub of the gear-wheel 9 is a centrally-located shaft 12, which is provided on its lower end with a tool-holder 12ª and on its upper end with a clutch member 13, adapted to slide within the boss 10. The clutch member is provided with teeth 14 15 on its upper and lower faces, which are adapted to be engaged by teeth 16, projecting from the lower end of the shank 11, and by teeth 17, projecting from the upper end of the hub 8, respectively, so that by moving the shaft up or down the clutch member may be engaged by the teeth 16 or the teeth 17 and driven by either the shank 11 or the gear-wheel 9, as desired.

The shaft 12 is provided with a collar 18, which is fitted to screw-threads 19 on said shaft. By adjusting this collar up against the lower end of the hub 8 the clutch member is maintained in engagement with the teeth 17 on the upper end of said hub for the purpose below described.

Arranged between the disks 2 and 3 and journaled on studs 20, rising from the lower disk 3, is a pair of pinions 21, which mesh with the gear-wheel 9 and also with the teeth of an internal gear-ring 22, the latter being rotatably mounted within the frame 1 between the two disks.

The inner faces of the two disks are provided with annular ribs and grooves 23 24, respectively, which register with each other. The ribs of the upper disk are cut away, as at 25, for the reception of a radially-movable block 26, and the ribs of the lower disk are cut away, so as to afford an opening 27 for the reception of the pinions 21. The block 26 is provided with a stem 28, which extends upwardly through a slot 29 in the upper disk 2 and is screw-threaded for the reception of a thumb-nut 30, by means of which the block 26 may be secured in its positions of radial adjustment. The internal gear-ring is provided with a flange or extension 31, which is provided with a socket 32, adapted to register with the block 26, and thereby connect said gear-ring to the upper disk 2, so as to be rotatable therewith.

If the block 26 be disengaged from the socket 32 and moved into the opening 27 in the ribs 23, the block will take against one of said ribs, and thereby connect the upper disk with the lower disk, so that both disks rotate as a unit.

The frame 1 is provided with a vertically-disposed pin 33, having an enlarged portion 34, which is adapted to register with a socket 35 in the gear-ring 22 and with a socket 36 in the lower disk 3, and thereby lock either the gear-ring or the lower disk to the frame. The enlarged portion of the pin 33 is cut away on its opposite sides, as at 37 and 38, the cut-away portion 37 being in line with the gear-ring 22 and the cut-away portion 38 being in line with the lower disk 3. Thus it will be seen that by giving the pin a half-turn either the gear-ring or the lower disk may be locked with the frame 1 and that when one is locked the other is free to rotate past one of the cut-away portions 37 38.

The enlarged portion of the pin 33 is provided with an upwardly-extending teat 39, which is adapted to register with sockets 40 in the frame, and thereby prevent said pin from turning. The pin 33 is secured to the frame by a thumb-nut 41, by the manipulation of which the pin may be lowered to disengage the teat from its socket, adjusted to lock either the gear-ring or the lower disk to the frame, and then secured in its position of adjustment.

The shank 11 is adapted to be secured in the revolving tool-holder of a drilling-machine, and the frame 1 of the attachment is provided with an outwardly-extending arm 42, which is adapted to take against the frame 43 of a drilling-machine, and thereby prevent the frame 1 from turning when the shank 11 is being driven.

When it is desired to use the reverse motion for cutting internal screw-threads, &c., the parts occupy the positions shown in Figs. 2 and 3 of the drawings—that is to say, the block 26 is in engagement with the socket 32, so that the gear-ring 22 revolves with the shank 11 and upper disk 2, and the pin 33 is in engagement with the socket 36 in the lower disk 3, thereby preventing the latter from turning.

As the mechanism is lowered by the carriage 44 of the drilling-machine to engage the thread-cutting tool with the material to be acted upon the clutch member 13 is raised into engagement with the shank 11 and the latter actuates the shaft which carries said tool, the gear-ring 22 merely turning to actuate the pinions 21, which turn the gear-wheel 9 idly on the shaft 12.

After the thread has been cut it is necessary to reverse the motion of the tool in order to remove the latter from the work. As the mechanism is raised by the carriage 44 the clutch member 13 engages the gear-wheel 9, and the latter being driven in a reverse direction to that of the spindle actuates the tool in a manner to remove it from the work.

When it is desired to increase the speed of the tool in drilling, &c., the block 26 is disengaged from the gear-ring 22 and is moved into engagement with one of the ribs 23 of the lower disk 3, so that both disks revolve as a unit with the shank 11, the pin 33 is adjusted to release the lower disk and lock the gear-ring 22 with the stationary frame 1, and the nut 18 is screwed up against the lower end of the hub 8, so as to maintain the clutch member 13 in engagement with the gear-wheel 9. By this adjustment the pinions are rotated bodily around the shaft 12 by the shank 11 and are actuated by their engagement with the gear-ring 22 to drive the gear-wheel 9. Thus it will be seen that the gear-wheel 9 rotates in the same direction as the shank 11, and by reason of the different diameters of the respective gear-wheels the gear-wheel 9, and perforce the tool-holder 12$^a$, rotates at a higher rate of speed than that of the shank.

I claim—

1. The combination of a gear-wheel, a shank rotatably connected thereto and adapted to be attached to a drilling-machine, means to prevent the rotation of said gear-wheel, a stud carried by said shank, a second gear-wheel rotatably mounted on said stud and coacting with the first-named gear-wheel, a tool-holder, and gearing between said second gear-wheel and tool-holder.

2. The combination of a gear-wheel, a shank rotatably connected therewith and adapted to be attached to a drilling-machine, means to prevent the rotation of said gear-wheel, a stud carried by said shank, a second gear-wheel rotatably mounted on said stud and coacting with the first-named gear-wheel, a shaft, a tool-holder thereon, and a gear-wheel on said shaft coacting with said second gear-wheel.

3. The combination of a frame, a shank rotatably connected therewith and adapted to be attached to a drilling-machine, a gear-wheel fixed to said frame, a stud carried by said shank, a second gear-wheel rotatably mounted on said stud and coacting with the first-named gear-wheel, a tool-holder, gearing between said second gear-wheel and tool-holder, and an arm extending from said frame and adapted to take against the stationary frame of the drilling-machine.

4. The combination of a support, a rotatable shank adapted to be attached to a drilling-machine, a gear-wheel, a pinion coacting with said gear-wheel, a second gear-wheel coacting with said pinion, an independent member supporting said pinion, means for detachably securing said member to said support, means for detachably securing said member to said shank, means for detachably securing the first-named gear-wheel to said shank, means for detachably securing the first-named gear-wheel to said support, a tool-holder, means for engaging the latter with said second gear-wheel, and means for engaging said tool-holder with said shank.

5. The combination of a support, a pair of disks rotatably mounted therein, a shank extending from one of said disks and adapted to be attached to a drilling-machine, means for securing the other disk to said support, means for securing the last-named disk to said shank, an internal gear-wheel rotatably mounted between said disks, a pinion carried by the last-named disk and coacting with said gear-wheel, means for securing said gear-wheel to said support, means for securing said gear-wheel to said shank, a shaft, a tool-holder thereon, a gear-wheel loosely mounted on said shaft and coacting with said pinion, means for engaging said shaft with the last-named gear-wheel, and means for engaging said shaft with the shank.

In testimony whereof I affix my signature in presence of two witnesses.

WILLIAM H. ZELLERS.

Witnesses:
RALPH H. GAMBLE,
ANDREW V. GROUPE.